(12) United States Patent
Aparin et al.

(10) Patent No.: US 9,129,220 B2
(45) Date of Patent: Sep. 8, 2015

(54) METHODS AND SYSTEMS FOR DIGITAL NEURAL PROCESSING WITH DISCRETE-LEVEL SYNAPES AND PROBABILISTIC STDP

(75) Inventors: Vladimir Aparin, San Diego, CA (US); Subramaniam Venkatraman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 588 days.

(21) Appl. No.: 12/831,871

(22) Filed: Jul. 7, 2010

(65) Prior Publication Data

US 2012/0011093 A1 Jan. 12, 2012

(51) Int. Cl.
*G06F 15/18* (2006.01)
*G06N 3/04* (2006.01)
*G06N 3/063* (2006.01)

(52) U.S. Cl.
CPC ............ *G06N 3/049* (2013.01); *G06N 3/0472* (2013.01); *G06N 3/063* (2013.01)

(58) Field of Classification Search
USPC .......................................................... 706/33
See application file for complete search history.

(56) References Cited

U.S. PATENT DOCUMENTS

| 5,671,337 | A * | 9/1997 | Yoshihara | 706/43 |
| 2004/0153426 | A1 * | 8/2004 | Nugent | 706/25 |
| 2005/0137993 | A1 | 6/2005 | Poon | |
| 2008/0162391 | A1 | 7/2008 | Izhikevich | |
| 2009/0076993 | A1 * | 3/2009 | Ananthanarayanan et al. | 706/44 |
| 2009/0100117 | A1 | 4/2009 | Kondo | |
| 2010/0025589 | A1 | 2/2010 | Olcott et al. | |
| 2010/0076916 | A1 | 3/2010 | Van et al. | |
| 2010/0299296 | A1 * | 11/2010 | Modha et al. | 706/25 |
| 2010/0299297 | A1 * | 11/2010 | Breitwisch et al. | 706/33 |
| 2011/0004579 | A1 * | 1/2011 | Snider | 706/25 |
| 2011/0016071 | A1 * | 1/2011 | Guillen et al. | 706/27 |
| 2012/0109864 | A1 * | 5/2012 | Modha | 706/25 |

FOREIGN PATENT DOCUMENTS

| CN | 1464477 A | 12/2003 |
| JP | 2010117846 A | 5/2010 |
| TW | 200912905 A | 3/2009 |
| WO | WO-2005106762 A2 | 11/2005 |
| WO | WO-2009113993 A1 | 9/2009 |

OTHER PUBLICATIONS

Brown, Michael PS, et al. "Support vector machine classification of microarray gene expression data." University of California, Santa Cruz, Technical Report UCSC-CRL-99-09 (1999).*
Barrett AB, van Rossum MCW (2008) Optimal Learning Rules for Discrete Synapses. PLoS Comput Biol 4(11): e1000230. doi: 10.1371/journal.pcbi.1000230. Nov. 28, 2008.*

(Continued)

*Primary Examiner* — Jeffrey A Gaffin
*Assistant Examiner* — David H Kim
(74) *Attorney, Agent, or Firm* — Rupit M. Patel

(57) ABSTRACT

Certain embodiments of the present disclosure support implementation of a digital neural processor with discrete-level synapses and probabilistic synapse weight training.

44 Claims, 13 Drawing Sheets

(56) References Cited

OTHER PUBLICATIONS

D.H. O'Connor, G.M. Wittenberg, S.S.-H. Wang, "Graded bidirectional synaptic plasticity is composed of switch-like unitary events", in Proceedings of National Academy of Science USA, vol. 102, No. 27, pp. 9679-9684, Jul. 2005.

T. Elliot, "Discrete states of synaptic strength in a stochastic model of spike-timing-dependent plasticity", in Journal of Neural Computation, vol. 22, pp. 244-272, Jan. 2010.

C.C.H. Petersen, R.C. Malenka, R.A. Nicoll, J.J. Hopfield, "All-or-none potentiation at CA3-CA1 synapses", in Proceedings of National Academy of Science USA, vol. 95, pp. 4732-4737, Apr. 1998.

P. Xu, T.K. Horiuchi, A. Sarje, P. Abshire, "Stochastic synapse with short-term depression for silicon neurons", in IEEE Biomedical Circuits and Systems Conference, 2007, BIOCAS 2007, pp. 99-102, Nov. 2007.

D.H. Goldberg, G. Cauwenbergs, A.G. Andreou, "Probabilistic synaptic weighting in a reconfigurable network of VLSI integrate-and-fire neurons", in Journal of Neural Networks, vol. 14, issues 6-7, pp. 781-793, Jul. 2001.

International Search Report and Written Opinion—PCT/US2011/043259—ISA/EPO—Apr. 3, 2012.

Schemmel J. et al., "Implementing Synaptic Plasticity in a VLSI Spiking Neural Model", International Joint Conference on Neural Networks, 2006. IJCNN '06, Piscataway, NJ: IEEE Operations Center, Piscataway, NJ, USA, Jan. 1, 2006, pp. 1-6, XP002557202, ISBN: 978-0-7803-9490-2 Retrieved from the Internet: URL:http://www.kip.uni-heidelberg.de/Veroeffentiichungen/download.cgl/4620/ps/1774.pdf [retrieved on Nov. 23, 2009].

Nessler B., et al., "STDP enables spiking neurons to detect hidden causes of their inputs", NIPS 2009, Vancouver, Canada, 2009. 12. 7-10.

Taiwan Search Report—TW100124090—TIPO—Dec. 25, 2014.

Sunar B., et al., "A Provably Secure True Random Number Generator with Built-In Tolerance to Active Attacks", Proceedings of IEEE Transactions on Computers, Jan. 2007, vol. 56, Issue 1, pp. 109-119.

\* cited by examiner

METHODS AND SYSTEMS FOR DIGITAL NEURAL PROCESSING WITH DISCRETE-LEVEL SYNAPES AND PROBABILISTIC STDP

BACKGROUND

1. Field

Certain embodiments of the present disclosure generally relate to neural system engineering and, more particularly, to a method for implementing a digital neural processor with discrete-level synapses and probabilistic synapse weight training.

2. Background

Synapses that connect neurons of a neural system typically exhibit only a small number of discrete strength levels. For example, synapses in the *Cornu Ammonis* CA3-CA1 pathway of the hippocampus neural structure can be either binary or ternary. In the case of ternary synapse, one strength level can, for example, correspond to a depressed state induced by a long-term depression (LTD), another strength level can correspond to a potentiated state induced by a long-term potentiation (LTP), and a third strength level can correspond to an un-stimulated state that exists prior to applying the LTP or LTD. Transitions between discrete levels of the synapse strength can occur in a switch-like manner.

Neuromorphic processors can be implemented in analog, digital or mixed signal domain. The synapses are typically trained using a deterministic spike-timing-dependent plasticity (STDP) rule, which requires either analog or multi-level digital memory for storing synaptic weights. Either of these two types of memories presents technical challenges. The analog memory has a poor retention and cloning capability. It also requires a large die area for implementing STDP decays. On the other hand, the multi-level digital memory requires a large number of bits, which leads to a large number of parallel interconnect wires for implementing synaptic weight increments of a given accuracy.

SUMMARY

Certain embodiments of the present disclosure provide an electrical circuit. The electrical circuit generally includes a digital neural processing unit with one or more synapses and a post-synaptic neuron circuit connected to the synapses, wherein a weight of one of the synapses changes a value in discrete levels with a probability depending on a time elapsed between a pair of spikes originated from the post-synaptic neuron circuit and a pre-synaptic neuron circuit connected to the synapse.

Certain embodiments of the present disclosure provide a method for implementing a digital neural processing unit. The method generally includes connecting a post-synaptic neuron circuit of the neural processing unit with at least one synapse of the neural processing unit, and changing, in discrete levels, a weight value of one of the synapses with a probability depending on a time elapsed between a pair of spikes originated from the post-synaptic neuron circuit and a pre-synaptic neuron circuit connected to the synapse.

Certain embodiments of the present disclosure provide an apparatus for implementing a digital neural processing unit. The apparatus generally includes means for connecting a post-synaptic neuron circuit of the neural processing unit with at least one synapse of the neural processing unit, and means for changing, in discrete levels, a weight value of one of the synapses with a probability depending on a time elapsed between a pair of spikes originated from the post-synaptic neuron circuit and a pre-synaptic neuron circuit connected to the synapse.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Various embodiments of the disclosure are described more fully hereinafter with reference to the accompanying drawings. This disclosure may, however, be embodied in many different forms and should not be construed as limited to any specific structure or function presented throughout this disclosure. Rather, these embodiments are provided so that this disclosure will be thorough and complete, and will fully convey the scope of the disclosure to those skilled in the art. Based on the teachings herein one skilled in the art should appreciate that the scope of the disclosure is intended to cover any embodiment of the disclosure disclosed herein, whether implemented independently of or combined with any other embodiment of the disclosure. For example, an apparatus may be implemented or a method may be practiced using any number of the embodiments set forth herein. In addition, the scope of the disclosure is intended to cover such an apparatus or method which is practiced using other structure, functionality, or structure and functionality in addition to or other than the various embodiments of the disclosure set forth herein. It should be understood that any embodiment of the disclosure disclosed herein may be embodied by one or more elements of a claim.

The word "exemplary" is used herein to mean "serving as an example, instance, or illustration." Any embodiment described herein as "exemplary" is not necessarily to be construed as preferred or advantageous over other embodiments.

Although particular embodiments are described herein, many variations and permutations of these embodiments fall within the scope of the disclosure. Although some benefits and advantages of the preferred embodiments are mentioned, the scope of the disclosure is not intended to be limited to particular benefits, uses or objectives. Rather, embodiments of the disclosure are intended to be broadly applicable to different technologies, system configurations, networks and protocols, some of which are illustrated by way of example in the figures and in the following description of the preferred embodiments. The detailed description and drawings are merely illustrative of the disclosure rather than limiting, the scope of the disclosure being defined by the appended claims and equivalents thereof.

Exemplary Neural System

Figure 1:
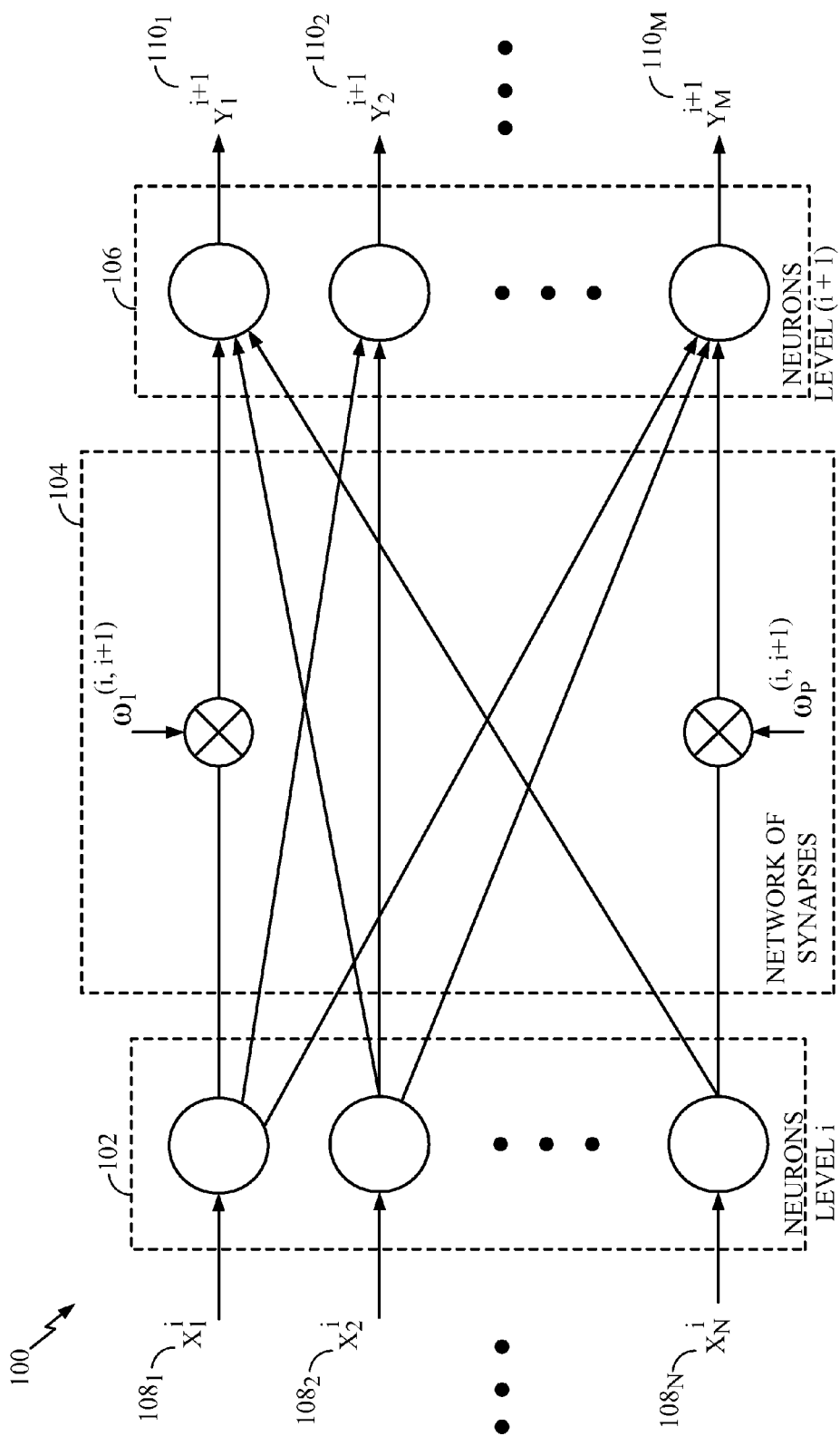
FIG. 1 illustrates an example neural system in accordance with certain embodiments of the present disclosure.

FIG. 1 illustrates an example neural system 100 with multiple levels of neurons in accordance with certain embodiments of the present disclosure. The neural system 100 may comprise a level of neurons 102 connected to another level of neurons 106 though a network of synapse connections 104. For simplicity, only two levels of neurons are illustrated in FIG. 1, although more levels of neurons may exist in a typical neural system.

As illustrated in FIG. 1, each neuron in the level 102 may receive an input signal 108 that may be generated by a plurality of neurons of a previous level (not shown in FIG. 1). The signal 108 may represent an input current of the level 102 neuron. This current may be accumulated on the neuron membrane to charge a membrane potential. When the membrane potential reaches its threshold value, the neuron may fire and output a spike to be transferred to the next level of neurons (e.g., the level 106).

The transfer of spikes from one level of neurons to another may be achieved through the network of synaptic connections (or simply "synapses") 104, as illustrated in FIG. 1. The synapses 104 may receive output signals (i.e., spikes) from the level 102 neurons, scale those signals according to adjustable synaptic weights $w_1^{(i,i+1)}, \ldots, w_P^{(i,i+1)}$ (where P is a total number of synaptic connections between the neurons of levels 102 and 106), and combine the scaled signals as an input signal of each neuron in the level 106. Every neuron in the level 106 may generate output spikes 110 based on the corresponding combined input signal. The output spikes 110 may be then transferred to another level of neurons using another network of synaptic connections (not shown in FIG. 1).

The neural system 100 may be emulated by an electrical circuit and utilized in a large range of applications, such as pattern recognition, machine learning and motor control. Each neuron in the neural system 100 may be implemented as a neuron circuit. The neuron membrane charged to the threshold value initiating the output spike may be implemented as a capacitor which integrates an electrical current that flows through it.

The capacitor may be eliminated as the electrical current integrating device of the neuron circuit, and a memristor element may be used in its place. This approach may be applied in neuron circuits, as well as in various other applications where bulky capacitors are utilized as electrical current integrators. In addition, each of the synapses 104 may be implemented based on a memristor element, wherein synaptic weight changes may relate to changes of the memristor resistance. With nanometer feature-sized memristors, the area of neuron circuit and synapses may be substantially reduced, which may make implementation of a very large-scale neural system hardware implementation practical.

Certain embodiments of the present disclosure provide implementation of a digital neural processing unit emulating a neuron of the neural system 100 and its associated synapses. Synaptic weights of the neural processing unit may comprise quantized levels, and weight training based on spike-timing-dependent plasticity (STDP) may be of a probabilistic nature. In other words, not every pair of pre- and post-synaptic spikes may lead to a potentiation or depression of the corresponding synapse. The synapses may comprise, for example, only three or even two levels of strength (i.e., binary synapses). Mathematically, the binary synapses may be able to implement the continuous STDP rule in an ensemble, in which individual synapses may undergo probabilistic switch-like potentiation or depression. The probabilistic STDP may lead to a simpler hardware implementation of the digital neural processing unit.

Exemplary Discrete-Level Synapses and Probabilistic Weight Change

Figure 2:
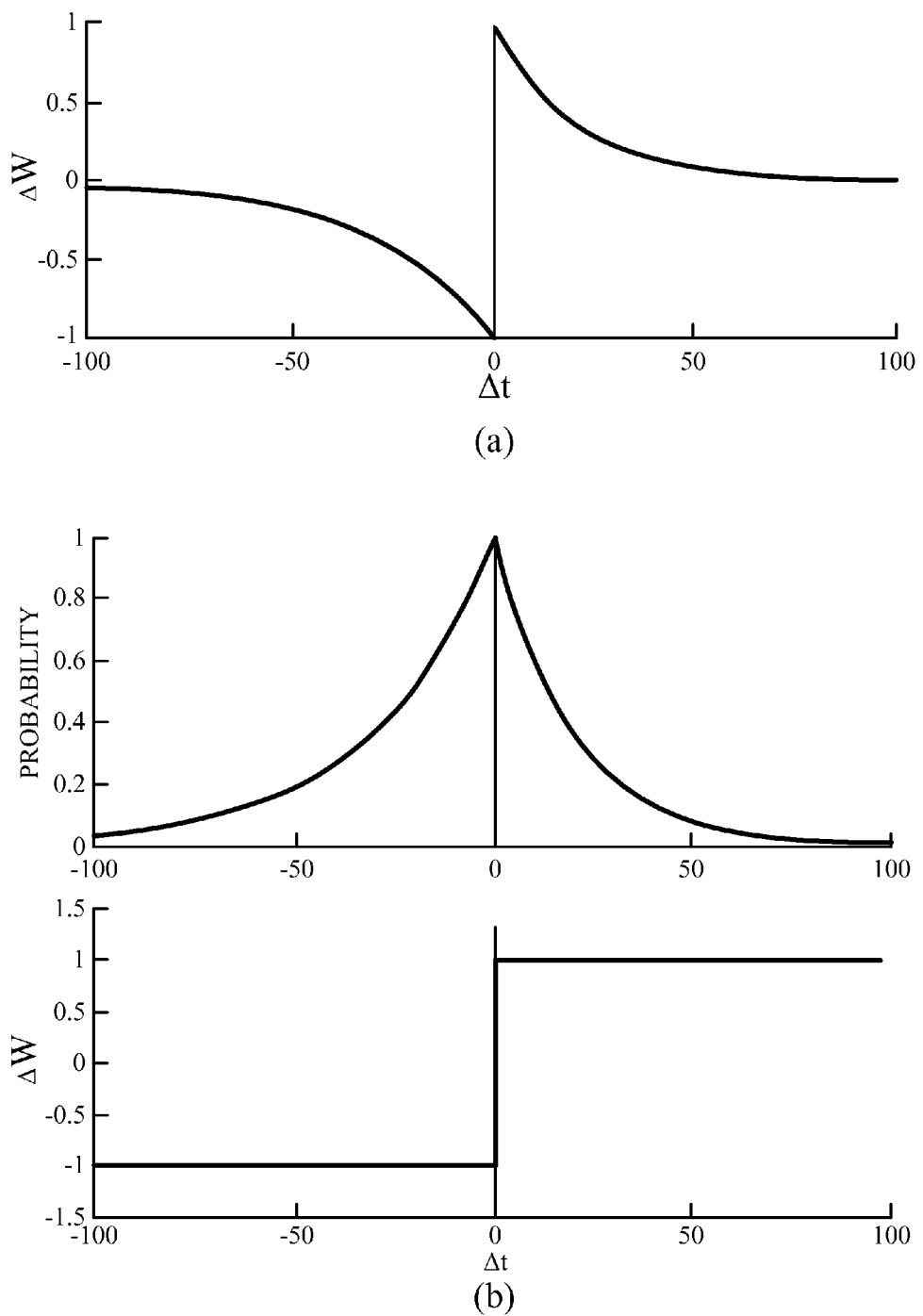
FIG. 2 illustrates an example of deterministic and probabilistic synapse weight changes in accordance with certain embodiments of the present disclosure.

In the conventional deterministic STDP, a change in synapse weight $\Delta W$ may be a function of a time difference $\Delta t$ between a pre-synaptic spike and a post-synaptic spike, as illustrated in FIG. 2A. Instead, a synapse weight change $\Delta W$ may be kept constant, while a probability of the weight change may be a function of the time difference between pre-synaptic and post-synaptic spikes, as illustrated in FIG. 2B. This approach can be referred to as a probabilistic STDP. Over a large number of spikes, the deterministic and probabilistic STDP approaches may converge to the same result. However, the probabilistic STDP may be easier to implement in hardware.

According to a widely accepted theory of STDP, individual synapses may be modified according to biphasic, exponentially decaying curves for a single pre-synaptic/post-synaptic spike pair. Therefore, the assumption of discrete levels associated with a synaptic strength contradicts the theory of graded STDP. However, this theory has been developed based on experiments where synaptic changes were measured across many synapses and over multiple spike pairs. If the exponentially decaying LTP and LTD curves belong to a population of synapses, then these curves may be realized with discrete-state synapses trained by a probabilistic (stochastic) STDP. Individual synapses may undergo a one-step potentiation or depression with a probability that may depend on spike timing, with larger time differences between pre-synaptic and post-synaptic spikes reducing the probability compared to smaller time differences.

With the aforementioned discrete-step probabilistic STDP, even if synaptic strength is binary, an entire polysynaptic projection between afferent and target may still express the graded STDP, although individual synapses may not. If a single synapse comprises several strength levels, then the synapse may express the graded STDP over multiple spike pairs, but with a possible saturation at upper or lower strength levels, depending on the number of strength levels.

Figure 3:
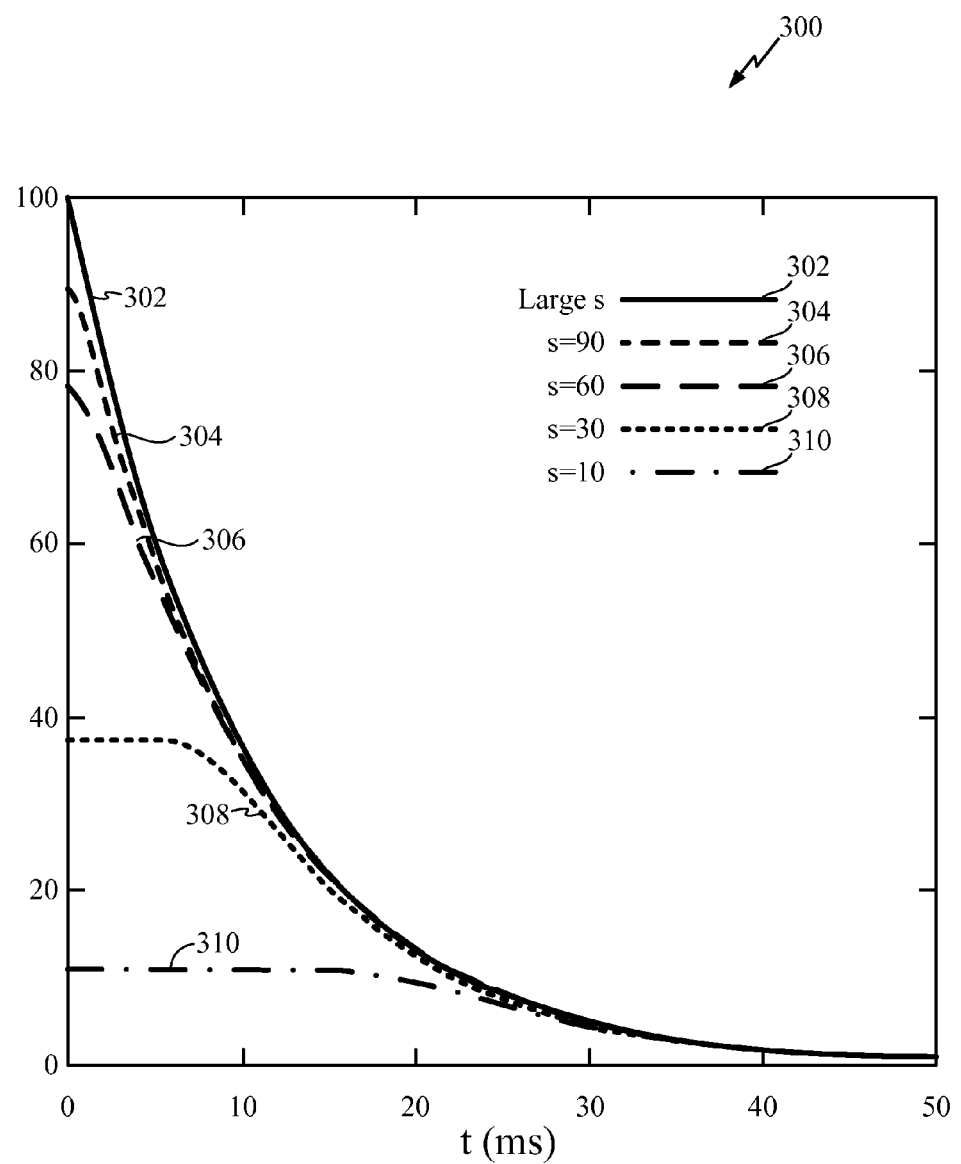
FIG. 3 illustrates an example of average relative modification of a synapse strength over a plurality of pre- and post-synaptic spike pairs for different numbers of strength levels in accordance with certain embodiments of the present disclosure.

FIG. 3 illustrates an example graph 300 of average relative modification of single synapse strength over many pre- and post-synaptic spike pairs for different numbers of strength levels (i.e., the number of strength levels s can be 10, 30, 60, 90 and more than 90). The saturation can be observed at upper synapse strength levels, especially for lower numbers of strength levels (e.g., see plots 308 and 310 for s equal to 10 and 30, respectively). Further, it can be observed that for all numbers of strength levels, the change of synapse strength may substantially decrease, as the time between pre-synaptic and postsynaptic spikes is larger.

Figure 4:
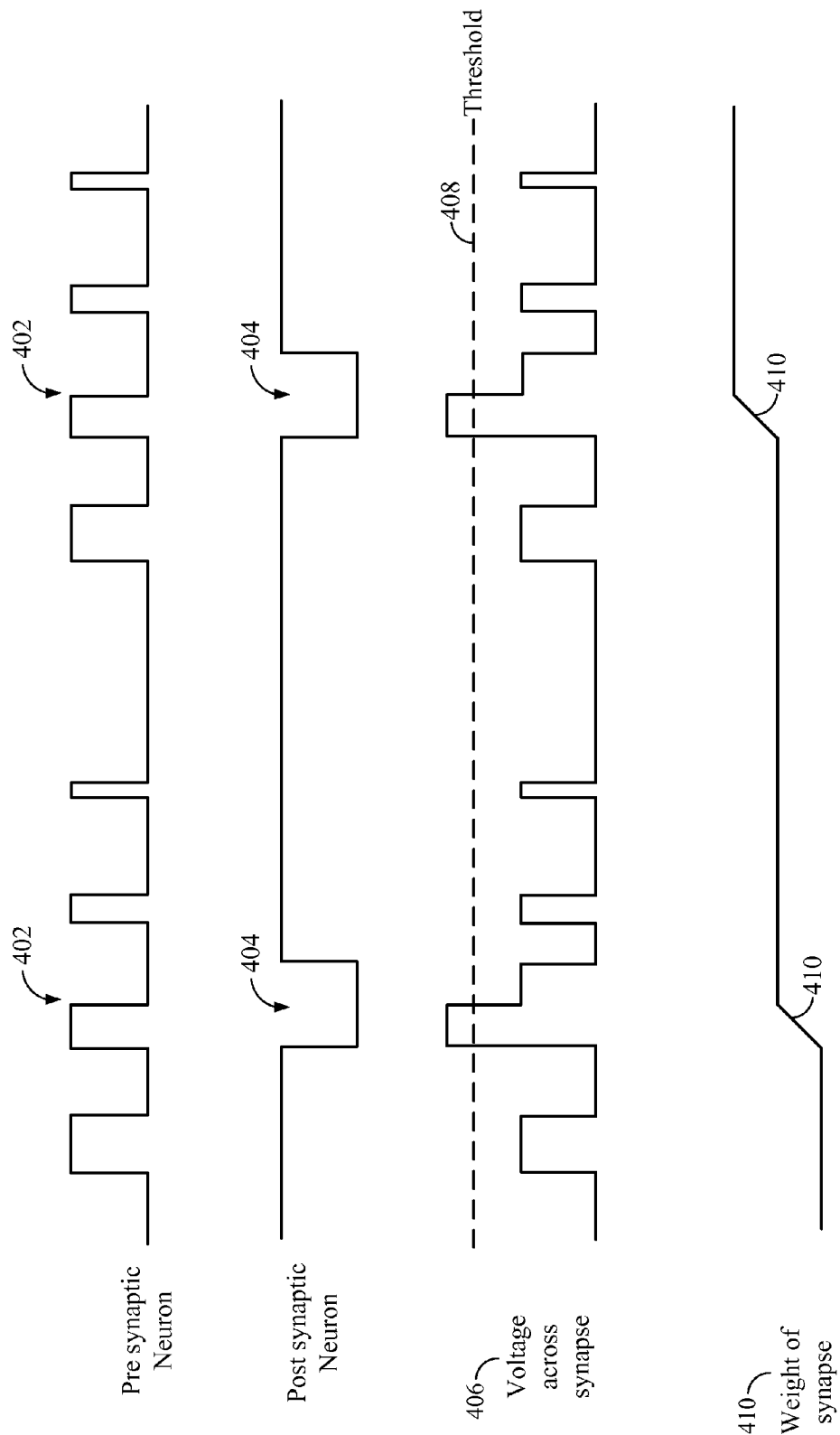
FIG. 4 illustrates an example pulse width modulated (PWM) synapse weight change in accordance with certain embodiments of the present disclosure.

The deterministic STDP based training of memristive synapses may typically rely on a pulse width modulated (PWM) signal decaying over time. FIG. 4 illustrates an example PWM-based memristive synapse weight change in accordance with certain embodiments of the present disclosure. It can be observed that a spike of a pre-synaptic neuron may be represented with the PWM signal 402 decaying over time. When a voltage across the synapse 406 exceeds a threshold level 408 during a post-synaptic spike 404, it may cause a change in synapse weight 410. Thus, the change in synapse weight may be a function of the difference in time between the pre-synaptic spike 402 and the post-synaptic spike 404.

Figure 5:
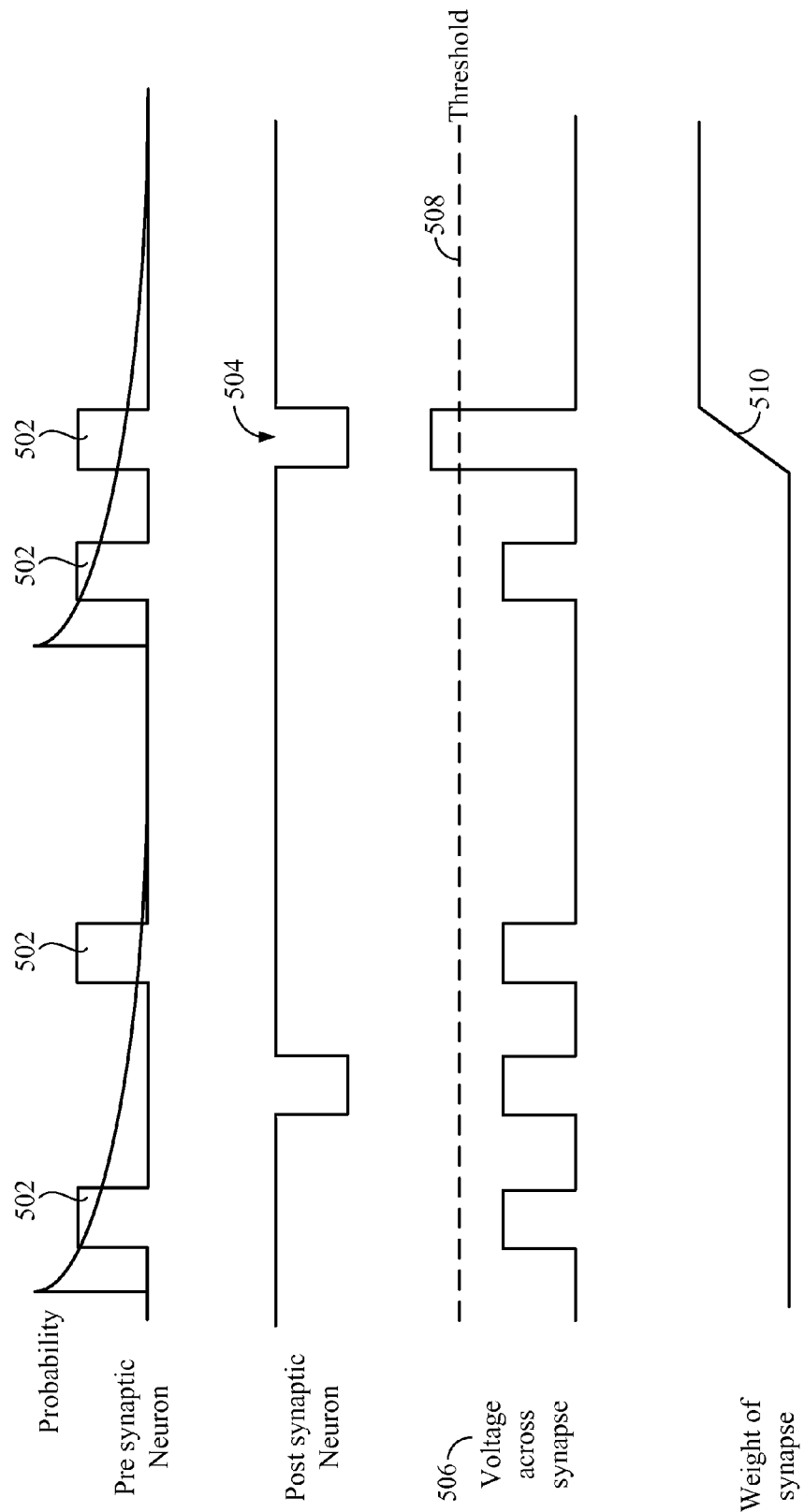
FIG. 5 illustrates an example probabilistic synapse weight change in accordance with certain embodiments of the present disclosure.

FIG. 5 illustrates an example probabilistic synapse weight change in accordance with certain embodiments of the present disclosure. It may be utilized a constant width pulse 502 decaying in probability, which may be a function of elapsed time since a pre-synaptic spike. A synapse weight change 510 may occur when a voltage 506 across the synapse exceeds a threshold level 508 during a post-synaptic spike 504 and the probabilistic pre-synaptic pulse 502. Over a large number of trials, this probabilistic approach may lead to the same synapse weight change as the PWM scheme illustrated in FIG. 4. However, the probabilistic scheme from FIG. 5 may be easier to implement in hardware.

By applying the probabilistic STDP, effective value of least significant bit (LSB) for representing synapse weights may decrease, and the synapse weights may be represented with fewer bits. In addition, a probability of pulse affecting the synapse weight may be adjusted (e.g., may be set to a lower value) in order to make up for non-linear switching of nano-devices in one direction. The probabilistic STDP may be also applicable to learning rules since the weight learning may occur over many tens or hundreds of spikes over slow time scales.

In an exemplary case, binary synapses with the probabilistic STDP may be utilized if sufficient redundancy is present in a network of synapses, namely multiple binary devices may make up any synapse of arbitrary numbers of strength levels. These binary synapses may be also suitable if switching threshold of binary nano-devices is highly variable, which is a very plausible scenario. Further, if switching in an electronic device itself is probabilistic (e.g., spin torque transfer RAM (Random Access Memory)), the probabilistic STDP may be used to implement probabilistic synapses without requiring circuitry to create pulses with an exponentially decreasing probability.

Exemplary Neural Processing Unit Architecture

Figure 6:
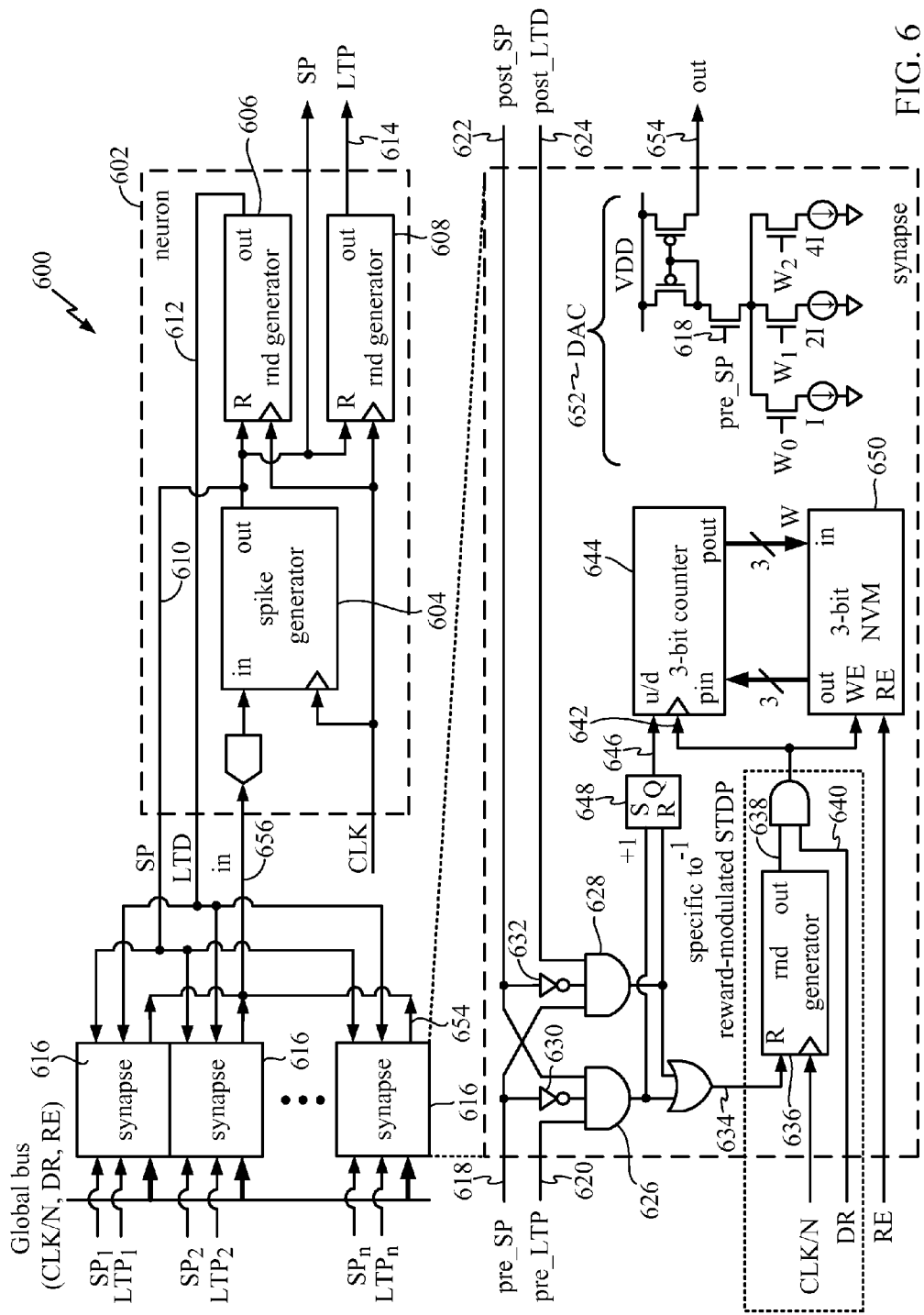
FIG. 6 illustrates an example block diagram of a neural processing unit with discrete-level synapses and probabilistic weight training in accordance with certain embodiments of the present disclosure.

Certain embodiments of the present disclosure support implementing a digital neural processing unit with quantized levels of synaptic weights, while the weight training may be based on the aforementioned probabilistic STDP. FIG. 6 illustrates an example architecture of a neural processing unit 600 with 8-level (i.e., 3-bit) synapses and the probabilistic STDP in accordance with certain embodiments of the present disclosure.

A neuron 602 may comprise a spike generator 604 and two random binary generator circuits 606 and 608 for long-term potentiation (LTP) and long-term depression (LTD), respectively. The generator circuits 606-608 may be reset (triggered) by a spike signal 610 associated with the neuron 602, and they may produce binary codes (i.e., pulse signals) 612-614 with a probability of logic "1" (i.e., pulse) to occur in a defined time interval exponentially decaying over time from a reset moment. The probabilistic pulse signals 612 and 614 may represent LTD and LTP training signals, respectively. The decay time constant of the probability may be specific to LTP and LTD parts of the STDP characteristic (for example, typical values may be $\tau_+$=16.8 ms and $\tau_-$=33.7 ms for the LTP and LTD, respectively). It should be noted that the probabilistic LTP signal 614 may cause another weight value of another synapse connected to the neural processing unit 600 to increase by a defined discrete level.

Each synapse 616 may receive a pre-synaptic spike 618 and a pre-synaptic LTP signal 620, as well as a post-synaptic spike 622 and a post-synaptic LTD signal 624. It can be observed from FIG. 6 that the post-synaptic spike 622 may correspond to the spike signal 610, and the post-synaptic LTD signal 624 may correspond to the probabilistic binary code signal 612. A logic consisting of two AND gates 626-628 and two inverters 630-632 may detect a training event. The LTP training event may be detected when the pre-synaptic LTP signal 620 is equal to logic "1," the post-synaptic spike signal 622 is equal to logic "1," and the pre-synaptic spike signal 618 is equal to logic "0." On the other hand, the LTD training event may be detected when the post-synaptic LTD signal 624 is equal to logic "1," the pre-synaptic spike signal 618 is equal to logic "1," and the post-synaptic spike signal 622 is equal to logic "0."

According to this logic, no training may take place when both pre- and post-synaptic neurons spike simultaneously (i.e., when both the pre-synaptic spike signal 618 and the post-synaptic spike signal 622 are equal to logic "1"). In the case of reward-modulated STDP, the weight training may not take place right away when the above conditions are satisfied. Instead, an output 634 of the training-event detector may reset (i.e., trigger) a random generator circuit 636 of the synapse 616, which may then start generating a binary code 638 with a probability of logic "1" exponentially decaying over time from the reset moment. The decay time constant of the probability may be specific to the eligibility trace of the reward-modulated STDP.

The output 638 of the random binary generator 636 may be gated by a distal reward (DR) gate signal 640, and then it may be applied as a clock signal 642 to an up-down counter 644 that stores a current weight value of the synapse 616. A state of the counter 644 may be incremented if the detected training event corresponds to the LTP (i.e., an output 646 of an SR latch 648 is equal to logic "1"). On the other hand, the counter state may be decremented if the detected training event corresponds to the LTD (i.e., the output 646 of the SR latch 648 is equal to logic "0").

The gated output 642 of the random generator 636 may be also utilized to trigger transferring of the counter state into a non-volatile memory (NVM) 650. The synaptic weight stored in the up-down counter 644 may be also used as an input to a binary-weighted digital-to-analog conversion (DAC) circuit 652. An output current 654 of the DAC 652 may be gated by the pre-synaptic spike signal 618 before being summed with output currents of other synapses connected to an input 656 of the neuron circuit 602.

Exemplary Random Binary Generator

Figure 7:
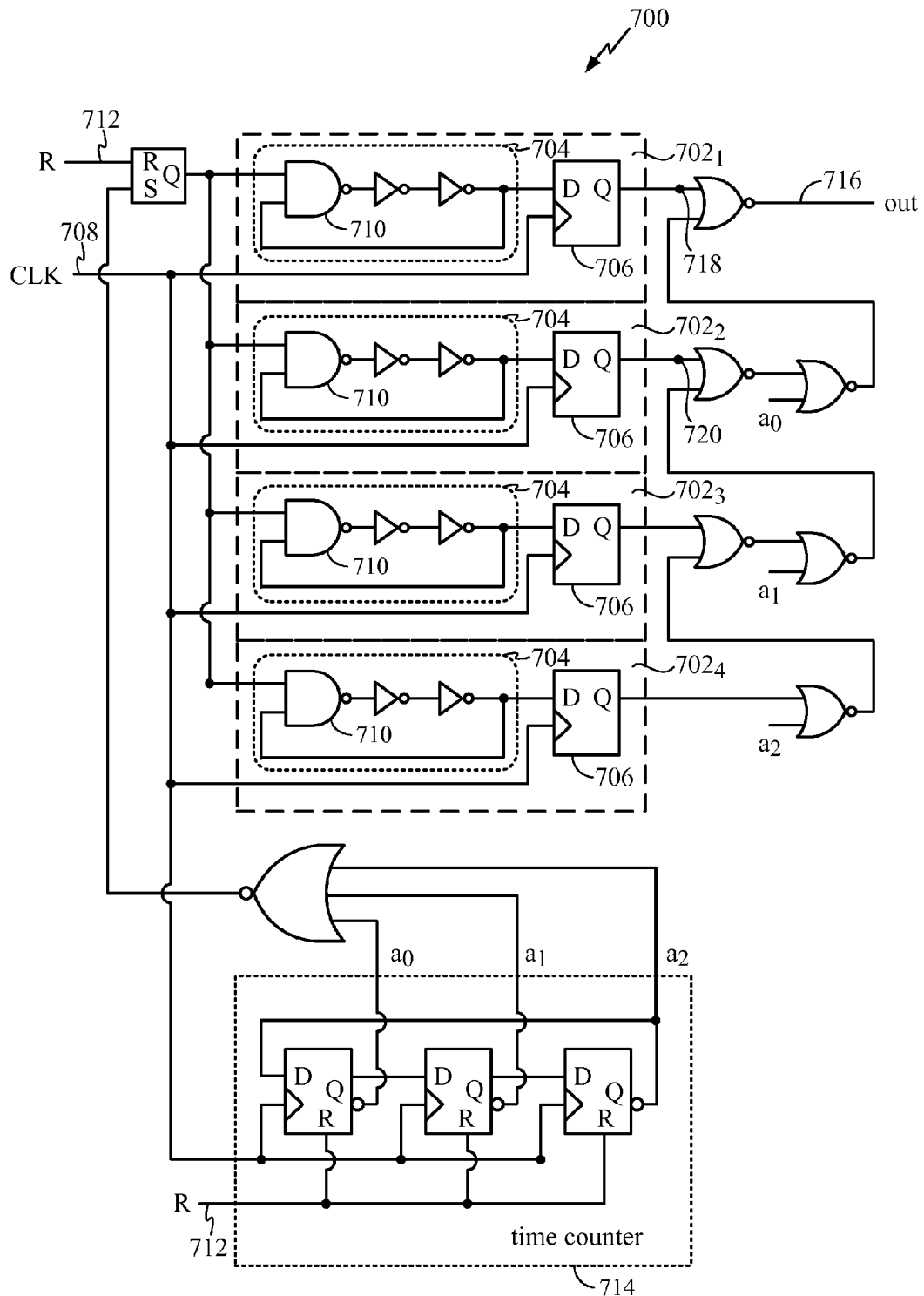
FIG. 7 illustrates an example block diagram of a random binary generator with exponentially decaying probability of logical one in accordance with certain embodiments of the present disclosure.

The random binary generator 636 with the exponentially decaying probability of logic "1" may represent essential part of the neural processing unit 600 illustrated in FIG. 6. One possible implementation of this generator is illustrated in FIG. 7. The random binary generator 700 may utilize random sub-generators $702_1$-$702_4$ based on ring oscillators 704 for producing a 4-bit serial binary number with a decaying probability of logic "1" in newer bits.

The ring oscillator 704 within each of the sub-generators $702_1$-$702_4$ may oscillate with a high jitter and a high drifting frequency, which may help producing a random binary signal when the oscillation is sampled by a D flip-flop 706 at fixed intervals of an external clock period (i.e., the period of an external clock 708). In order to reduce power consumption, the ring oscillator 704 within each of the sub-generators $702_1$-$702_4$ may be disabled by replacing one of the inverters in the ring by a NAND gate 710.

The random generator 700 may be triggered by a reset signal 712, which may enable the four ring oscillators 704 of the four sub-generators $702_1$-$702_4$. This reset signal may also reset a time counter 714. A first output bit at an output 716 after the reset signal 710 may be simply an output 718 of the first sub-generator $702_1$. A second output bit at the output 716 may be obtained as an AND function of the output 718 of the first sub-generator $702_1$ and an output 720 of the second sub-generator $702_2$, and so on.

The probability of logic "1" of the described random generator 700 may decay from 0.5 for the first output bit to 0.0625 for the fourth output bit. This probability may be modified by using different logic functions of the outputs of the sub-generators $702_1$-$702_4$. An AND gate may reduce the probability of occurrences of logic 1's. On the other hand, an OR gate may increase the occurrence of logic 1's. Therefore, the derivation of specific probabilities may be achieved through two basic analytical probability formulas:

$$P(A \cdot B) = P(A) \cdot P(B), \quad (1)$$

$$P(A+B) = P(A) + P(B) - P(A) \cdot P(B). \quad (2)$$

Figure 8:
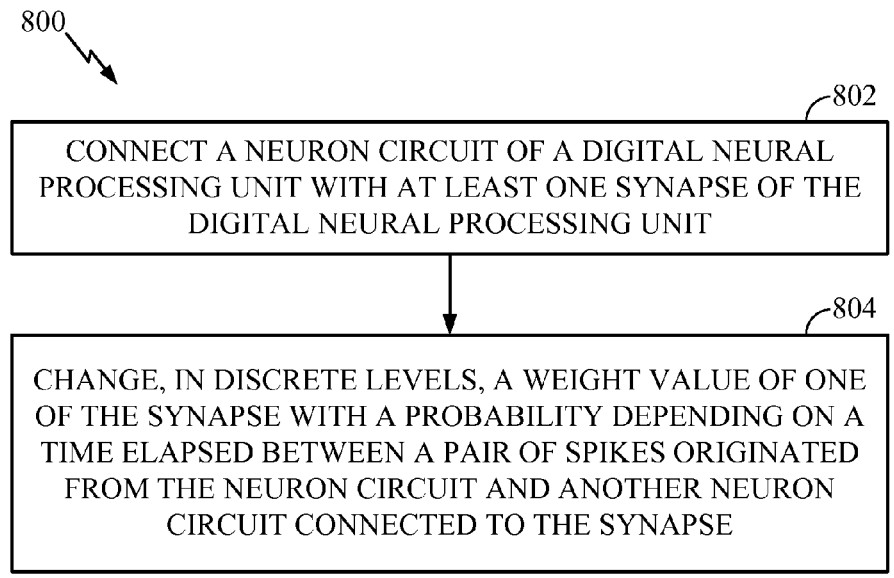
FIG. 8 illustrates example operations for implementing a neural processor with discrete-level synapses and probabilistic weight training in accordance with certain embodiments of the present disclosure.

FIG. 8 illustrates example operations 800 for implementing a digital neural processor (such as the processing unit 600 from FIG. 6) with discrete-level synapses and probabilistic weight training in accordance with certain embodiments of the present disclosure. At 802, a neuron circuit (e.g., the post-synaptic neuron circuit 602) of the neural processing unit may be connected with at least one synapse (e.g., the synapses 616) of the neural processing unit.

At 804, a weight value of one of the synapses may be changed in discrete levels with a probability depending on time between a spike (e.g., the spike 610) originated from the neuron circuit and a spike (e.g., the spike 618) originated from another neuron circuit (i.e., from a pre-synaptic neuron circuit) connected to the synapse. The post-synaptic neuron circuit may comprise at least one generator circuit (e.g., at least one of the random generators 606 and 608) triggered by one of the spikes to generate at least one pulse signal with a probability of each pulse to occur in a defined time interval exponentially decaying over time. One of the pulses (e.g., a pulse of the LTD signal 612) may cause the weight value to decrease.

The proposed digital neuromorphic processor utilizing discrete-level synapses and probabilistic STDP may provide several advantages over analog and digital implementations with the deterministic STDP. First, it may require less number of discrete levels of a synaptic strength: even two or three levels of the synaptic strength may be sufficient. This may require fewer bits to be stored in the synaptic memory. Second, implementation of synapses may require less hardware and, therefore, the synapse connections may occupy less die area. Third, the synapses may comprise fewer inputs than synapses in the deterministic digital implementation thanks to replacement of multi-bit LTD and LTP inputs by one-bit LTP, LTD and spike inputs. Fewer synaptic inputs may translate to easier wiring and possibly to die area savings.

It should be noted that the term "probabilistic" may be applied only to the synapse training and not to spike signaling. Once the synapses are probabilistically trained, the training process may be turned off, and a neural system may continue operating deterministically in order to avoid ambiguous behavior.

Exemplary Simulation Results

Figure 9:
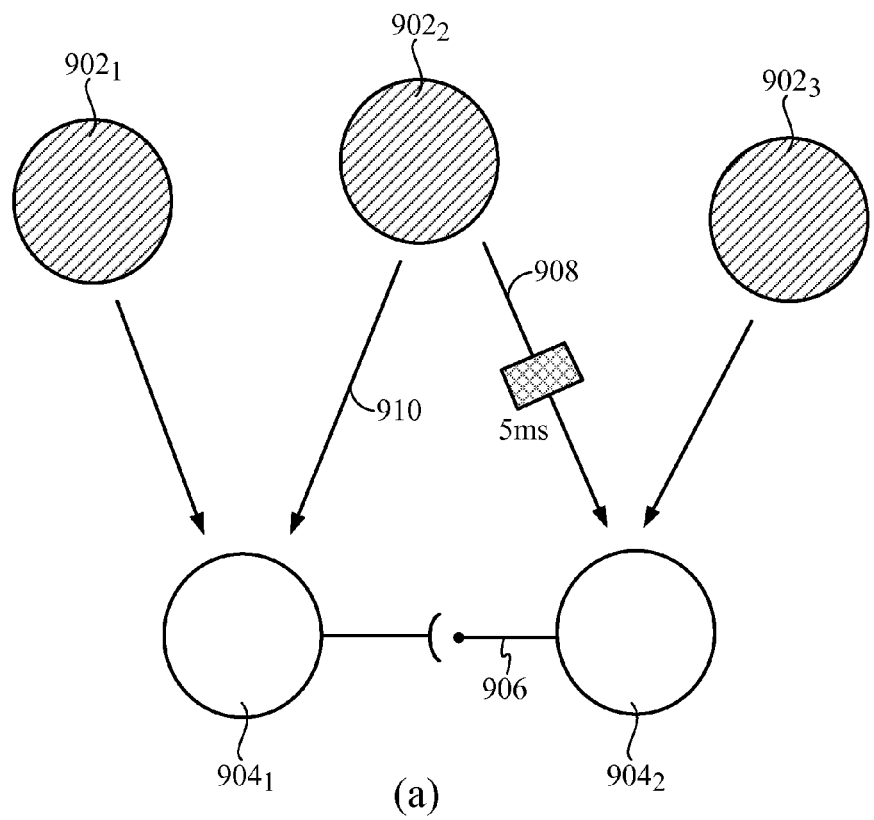
FIGS. 9(a)-(b) illustrate an example configurations of neurons and synapses used for simulations in accordance with certain embodiments of the present disclosure.
Figure 9:
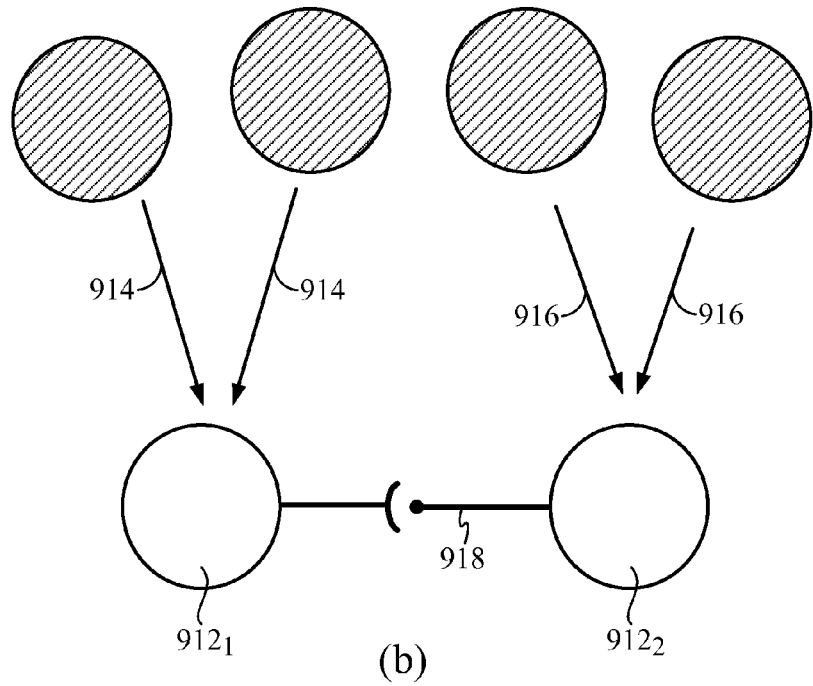

Simulations can be performed to show that the deterministic STDP and the digitally implemented probabilistic STDP may converge to the same result. FIGS. 9(a)-(b) illustrate example neurons 900 with synapses used in the simulations in accordance with certain embodiments of the present disclosure. Neurons $902_1$-$902_3$ may provide random spikes at, for example, an average firing rate of 5 Hz, and neurons $904_1$-$904_2$ may be connected with a synapse 906 under test.

In the experiment illustrated in FIG. 9(a), the neurons $904_1$-$904_2$ may be both connected to the same pre-synaptic neuron $902_2$, where the post-synaptic neuron $904_2$ may be connected with the pre-synaptic neuron $902_2$ through a synapse 908 with 5 ms delay comparing to a synapse 910 of an identical weight as the synapse 908. Therefore, the neurons $904_1$-$904_2$ may receive correlated spikes, and the synapse 906 may potentiate due to the STDP. On the other hand, in the experiment illustrated in FIG. 9(b), inputs delivered to neurons $912_1$-$912_2$ through synapses 914 and 916 may be mutually completely random, hence a weight value of a synapse 918 may be expected either to keep approximately the same value or to get depressed.

Figure 10A:
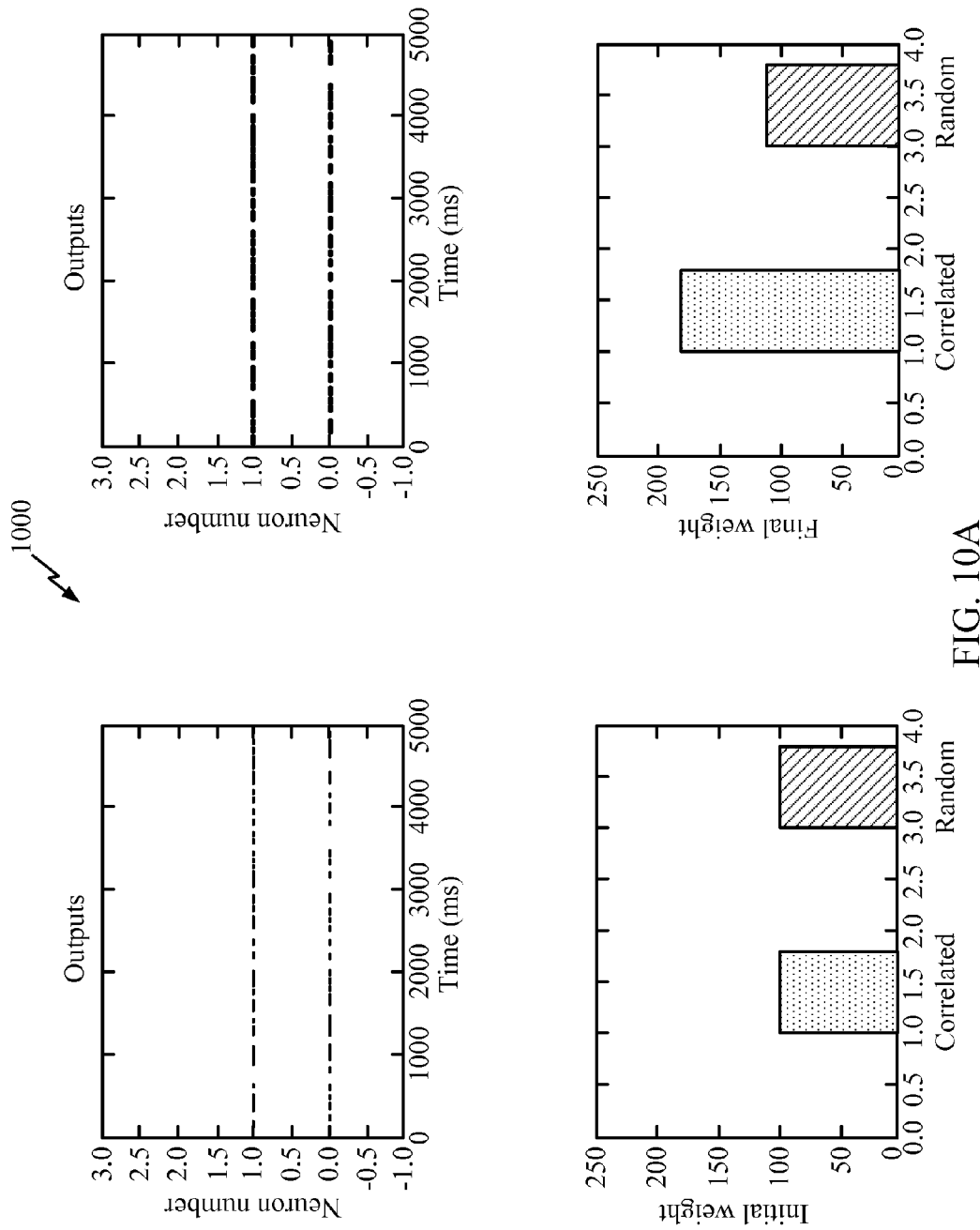
FIGS. 10A-10B illustrate example simulation results of a deterministic synapse weight training in accordance with certain embodiments of the present disclosure.
Figure 10B:
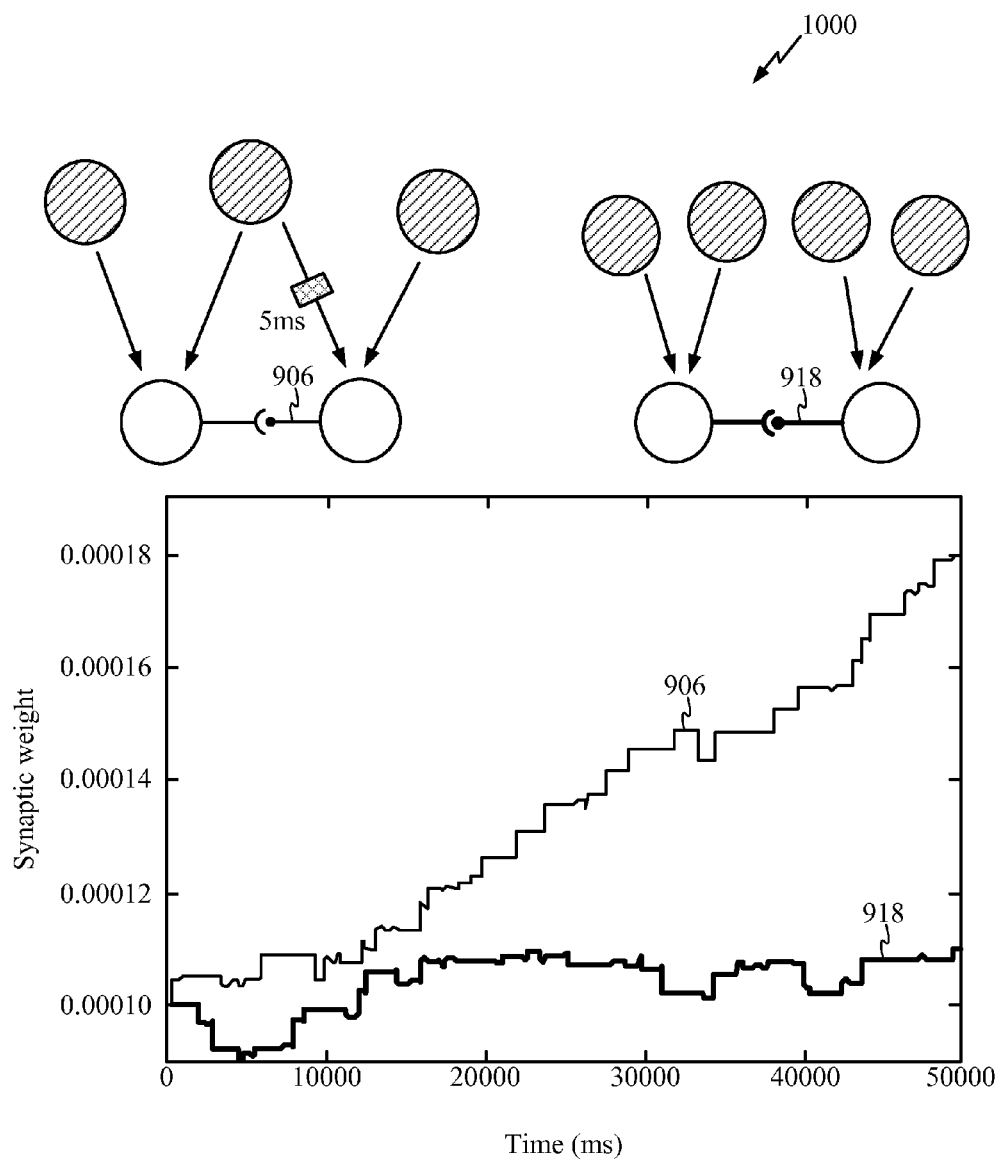
Figure 11A:
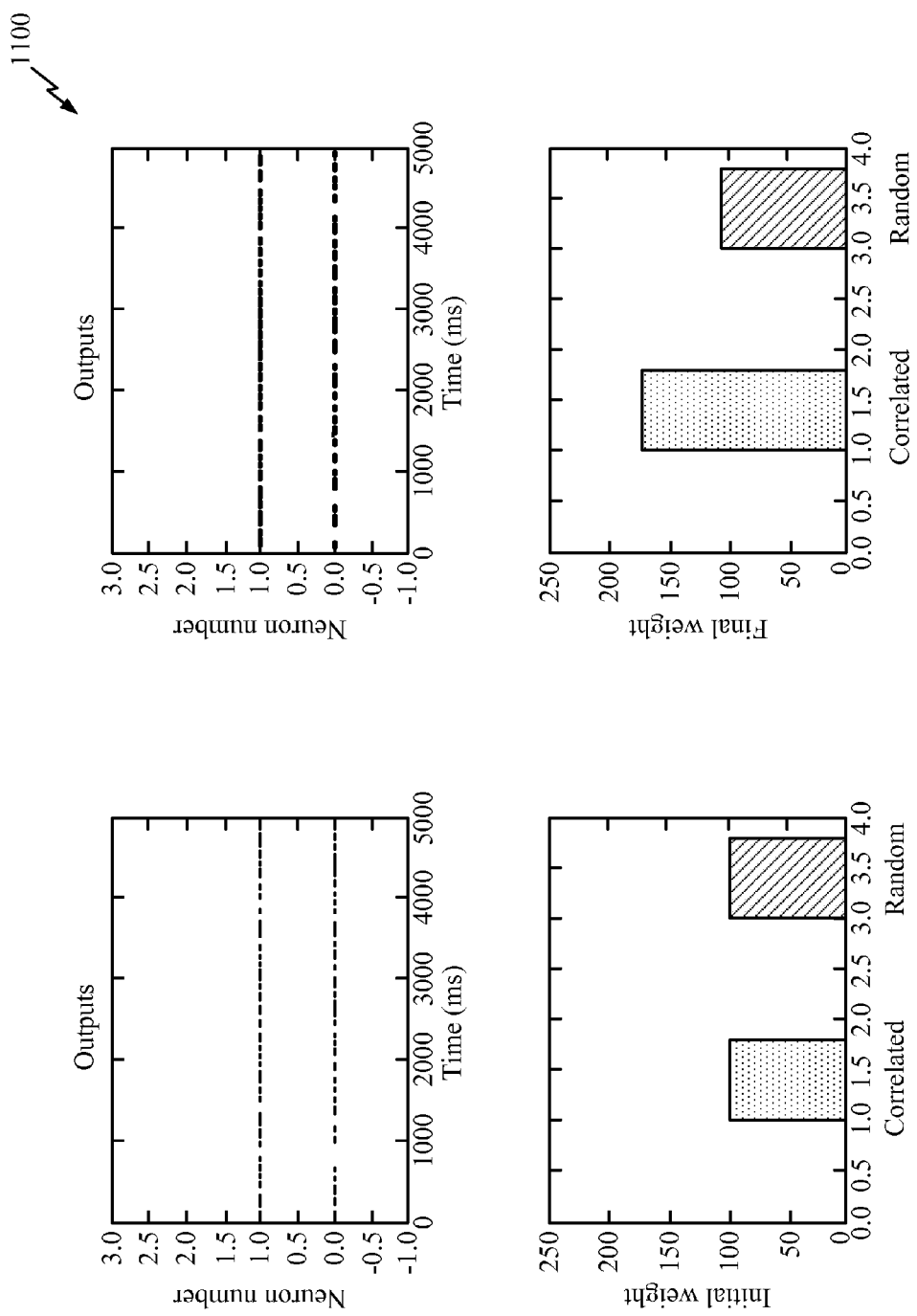
FIGS. 11A-11B illustrate example simulation results of a probabilistic synapse weight training in accordance with certain embodiments of the present disclosure.
Figure 11B:
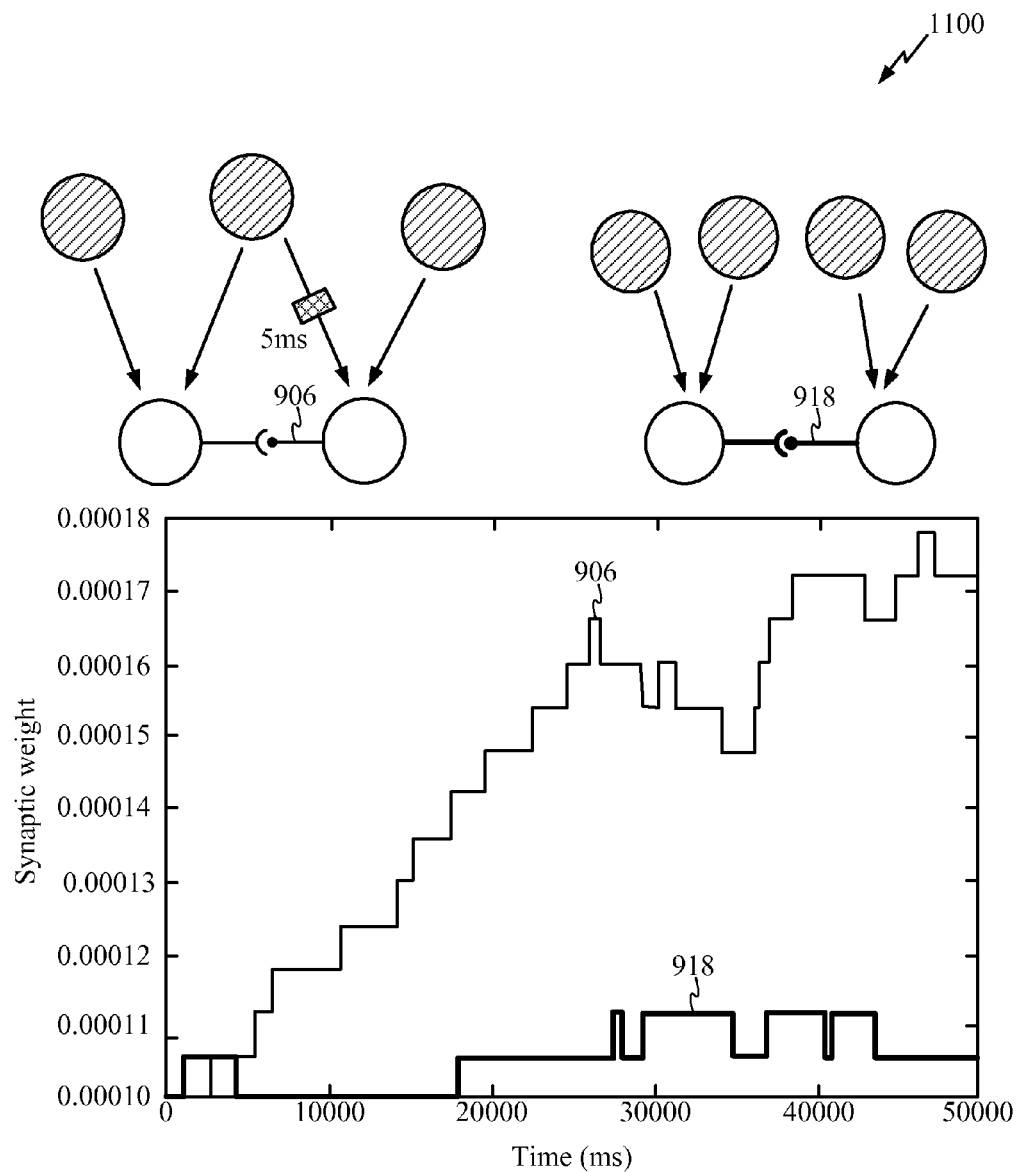

FIGS. 10A-10B illustrate results 1000 of the simulated aforementioned experiment from FIGS. 9(a)-(b) when the deterministic STDP is applied. It can be observed that the synapses 906 and 918 may potentiate as expected. The same experiment is repeated using the probabilistic STDP rule, and corresponding simulation results 1100 are illustrated in FIGS. 11A-11B. The weight change is now quantized and can only happen on a fraction of spikes with a probability given by the time difference between the pre- and post-synaptic spike times. It can be observed from FIGS. 11A-11B that the final weight values for the synapses 906 and 918 can be very close to the final weight values given in FIGS. 10A-10B obtained using the deterministic STDP rule.

Figure 8A:
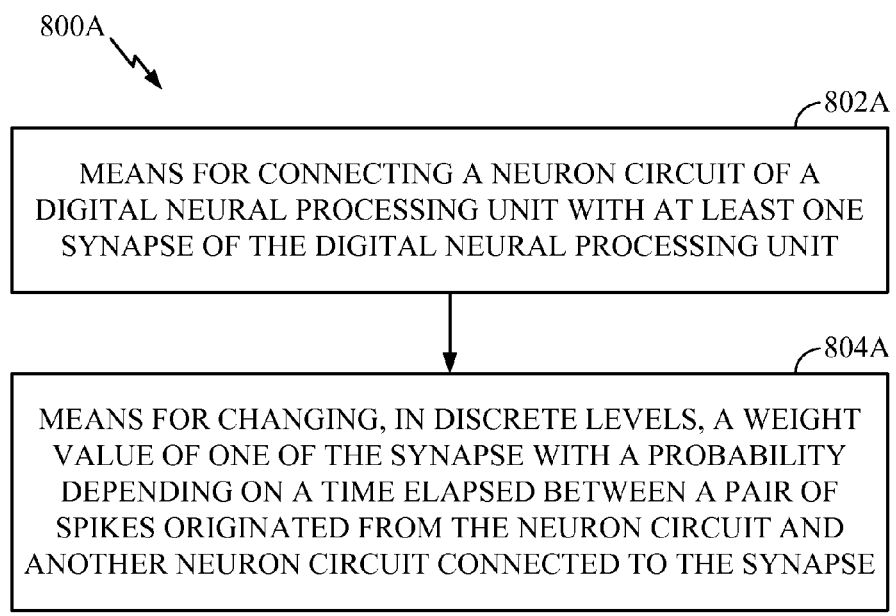
FIG. 8A illustrates example components capable of performing the operations illustrated in FIG. 8.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, operations 800 illustrated in FIG. 8 correspond to components 800A illustrated in FIG. 8A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

Thus, certain embodiments may comprise a computer program product for performing the operations presented herein. For example, such a computer program product may comprise a computer readable medium having instructions stored (and/or encoded) thereon, the instructions being executable by one or more processors to perform the operations described herein. For certain embodiments, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to embodiments of the present disclosure, other and further embodiments of the disclosure may be devised without departing from the basic scope thereof, and the scope thereof is determined by the claims that follow.

What is claimed is:

1. An electrical circuit, comprising:
 a digital neural processing unit with one or more synapses and a post-synaptic neuron circuit connected to the synapses,
 wherein a weight of one of the synapses changes a value in discrete levels with a probability depending on a time elapsed between a pair of spikes originated from the post-synaptic neuron circuit and a pre-synaptic neuron circuit connected to the synapse.

2. The electrical circuit of claim 1, wherein the probability exponentially decays as a function of the elapsed time.

3. The electrical circuit of claim 1, wherein the post-synaptic neuron circuit further comprises:
 at least one generator circuit triggered by one of the spikes to generate at least one pulse signal with a probability of each pulse to occur in a defined time interval exponentially decaying over time.

4. The electrical circuit of claim 3, wherein one of the pulses causes the weight value to decrease.

5. The electrical circuit of claim 3, wherein one of the pulses causes another weight value of another synapse connected to the neural processing unit to increase by a defined discrete level.

6. The electrical circuit of claim 3, wherein each of the generator circuits comprises ring oscillators.

7. The electrical circuit of claim 1, wherein the synapse further comprises:

a generator circuit triggered at least in part by one of the spikes to generate a pulse signal with a probability of each pulse to occur in a defined time interval exponentially decaying over time.

8. The electrical circuit of claim 7, wherein one of the pulses and a gate signal cause the weight value to increase.

9. The electrical circuit of claim 7, wherein one of the pulses and a gate signal cause the weight value to decrease.

10. The electrical circuit of claim 7, wherein the generator circuit comprises ring oscillators.

11. The electrical circuit of claim 1, wherein the synapse further comprises:
a digital-to-analog conversion circuit gated by one of the spikes generating an electrical current to be input into the post-synaptic neuron circuit, a value of the electrical current is based on the weight value of the synapse.

12. A method for implementing a digital neural processing unit, comprising:
connecting a post-synaptic neuron circuit of the neural processing unit with at least one synapse of the neural processing unit; and
changing, in discrete levels, a weight value of one of the synapses with a probability depending on a time elapsed between a pair of spikes originated from the post-synaptic neuron circuit and a pre-synaptic neuron circuit connected to the synapse.

13. The method of claim 12, wherein the probability exponentially decays as a function of the elapsed time.

14. The method of claim 12, further comprising:
triggering, by one of the spikes, at least one generator circuit within the post-synaptic neuron circuit to start generating at least one pulse signal with a probability of each pulse to occur in a defined time interval exponentially decaying over time.

15. The method of claim 14, wherein one of the pulses causes the weight value to decrease.

16. The method of claim 14, wherein one of the pulses causes another weight value of another synapse connected to the neural processing unit to increase by a defined discrete level.

17. The method of claim 14, wherein each of the generator circuits comprises ring oscillators.

18. The method of claim 12, further comprising:
triggering, at least in part by one of the spikes, a generator circuit within the synapse to start generating a pulse signal with a probability of each pulse to occur in a defined time interval exponentially decaying over time.

19. The method of claim 18, wherein one of the pulses and a gate signal cause the weight value to increase.

20. The method of claim 18, wherein one of the pulses and a gate signal cause the weight value to decrease.

21. The method of claim 18, wherein the generator circuit comprises ring oscillators.

22. The method of claim 12, further comprising:
generating, by a digital-to-analog conversion circuit within the synapse gated by one of the spikes, an electrical current to be input into the post-synaptic neuron circuit, wherein a value of the electrical current is based on the weight value of the synapse.

23. An apparatus for implementing a digital neural processing unit, comprising:
means for connecting a post-synaptic neuron circuit of the neural processing unit with at least one synapse of the neural processing unit; and
means for changing, in discrete levels, a weight value of one of the synapses with a probability depending on a time elapsed between a pair of spikes originated from the post-synaptic neuron circuit and a pre-synaptic neuron circuit connected to the synapse.

24. The apparatus of claim 23, wherein the probability exponentially decays as a function of the elapsed time.

25. The apparatus of claim 23, further comprising:
means for triggering, by one of the spikes, at least one generator circuit within the post-synaptic neuron circuit to start generating at least one pulse signal with a probability of each pulse to occur in a defined time interval exponentially decaying over time.

26. The apparatus of claim 25, wherein one of the pulses causes the weight value to decrease.

27. The apparatus of claim 25, wherein one of the pulses causes another weight value of another synapse connected to the neural processing unit to increase by a defined discrete level.

28. The apparatus of claim 25, wherein each of the generator circuits comprises ring oscillators.

29. The apparatus of claim 23, further comprising:
means for triggering, at least in part by one of the spikes, a generator circuit within the synapse to start generating a pulse signal with a probability of each pulse to occur in a defined time interval exponentially decaying over time.

30. The apparatus of claim 29, wherein one of the pulses and a gate signal cause the weight value to increase.

31. The apparatus of claim 29, wherein one of the pulses and a gate signal cause the weight value to decrease.

32. The apparatus of claim 29, wherein the generator circuit comprises ring oscillators.

33. The apparatus of claim 23, further comprising:
means for generating, by a digital-to-analog conversion circuit within the synapse gated by one of the spikes, an electrical current to be input into the post-synaptic neuron circuit, wherein a value of the electrical current is based on the weight value of the synapse.

34. A computer program product in a digital neural processing unit, comprising a computer-readable medium comprising code for:
interfacing a post-synaptic neuron circuit of the neural processing unit with at least one synapse of the neural processing unit; and
changing, in discrete levels, a weight value of one of the synapses with a probability depending on a time elapsed between a pair of spikes originated from the post-synaptic neuron circuit and a pre-synaptic neuron circuit connected to the synapse.

35. The computer program product of claim 34, wherein the probability exponentially decays as a function of the elapsed time.

36. The computer program product of claim 34, wherein the computer-readable medium further comprises code for:
triggering, by one of the spikes, at least one generator circuit within the post-synaptic neuron circuit to start generating at least one pulse signal with a probability of each pulse to occur in a defined time interval exponentially decaying over time.

37. The computer program product of claim 36, wherein one of the pulses causes the weight value to decrease.

38. The computer program product of claim 36, wherein one of the pulses causes another weight value of another synapse connected to the neural processing unit to increase by a defined discrete level.

39. The computer program product of claim 36, wherein each of the generator circuits comprises ring oscillators.

40. The computer program product of claim 34, wherein the computer-readable medium further comprises code for:

triggering, at least in part by one of the spikes, a generator circuit within the synapse to start generating a pulse signal with a probability of each pulse to occur in a defined time interval exponentially decaying over time.

41. The computer program product of claim 40, wherein one of the pulses and a gate signal cause the weight value to increase.

42. The computer program product of claim 40, wherein one of the pulses and a gate signal cause the weight value to decrease.

43. The computer program product of claim 40, wherein the generator circuit comprises ring oscillators.

44. The computer program product of claim 34, wherein the computer-readable medium further comprises code for:
generating, by a digital-to-analog conversion circuit within the synapse gated by one of the spikes, an electrical current to be input into the post-synaptic neuron circuit, wherein a value of the electrical current is based on the weight value of the synapse.

* * * * *